(12) United States Patent  
Morita

(10) Patent No.: US 12,326,339 B2  
(45) Date of Patent: Jun. 10, 2025

(54) GENERATION OF CLUSTERS BASED ON PLURAL USER DATA RELEVANT TO TRAVEL STOPS

(71) Applicant: Piis Inc., Musashino (JP)

(72) Inventor: Shimpei Morita, Musashino (JP)

(73) Assignee: Piis Inc., Musashino (JP)

(*) Notice: Subject to any disclaimer, the term of this patent is extended or adjusted under 35 U.S.C. 154(b) by 320 days.

(21) Appl. No.: 17/940,388

(22) Filed: Sep. 8, 2022

(65) Prior Publication Data

US 2023/0018382 A1 Jan. 19, 2023

Related U.S. Application Data

(63) Continuation of application No. PCT/JP2021/005351, filed on Feb. 12, 2021.

(30) Foreign Application Priority Data

Mar. 16, 2020 (JP) ................... 2020-045879

(51) Int. Cl.  
*G01C 21/34* (2006.01)  
*G01C 21/32* (2006.01)  
(Continued)

(52) U.S. Cl.  
CPC ......... *G01C 21/3438* (2013.01); *G01C 21/32* (2013.01); *G01C 21/3694* (2013.01); *G06Q 30/0601* (2013.01)

(58) Field of Classification Search  
CPC .. G01C 21/3438; G01C 21/32; G01C 21/364; G06Q 30/0601

(Continued)

(56) References Cited

U.S. PATENT DOCUMENTS 8,645,393 B1* 2/2014 Kolak ................. G06F 16/355  
                                                 707/748  
8,725,569 B2* 5/2014 Liang ................. G06Q 30/0261  
                                                 705/14.66

(Continued)

FOREIGN PATENT DOCUMENTS

CN       118010040 A * 5/2024  
CN       118364183 A * 7/2024

(Continued)

OTHER PUBLICATIONS

Hung, CC., Peng, WC. & Lee, WC. Clustering and aggregating clues of trajectories for mining trajectory patterns and routes. The VLDB Journal 24, 169â192 (2015). https://doi.org/10.1007/s00778-011-0262-6 (Year: 2015).*

(Continued)

*Primary Examiner* — Angela Y Ortiz  
*Assistant Examiner* — Charles Pall  
(74) *Attorney, Agent, or Firm* — Maier & Maier, PLLC

(57) ABSTRACT

A cluster generation apparatus includes processing circuitry configured to acquire position information and time information for a plurality of users; generate a cluster based on spots visited by the users by using the position information for the users, the cluster being a classification of the users; and generate, for each generated cluster, a movement route based on a history of movement of the cluster between the spots, from the time information and the position information for the users belonging to the cluster.

16 Claims, 16 Drawing Sheets

(51) Int. Cl.
*G01C 21/36* (2006.01)
*G06Q 30/0601* (2023.01)

(58) Field of Classification Search
USPC .......................................................... 701/410
See application file for complete search history.

(56) References Cited

U.S. PATENT DOCUMENTS

| | | | | |
|---|---|---|---|---|
| 8,892,461 | B2* | 11/2014 | Lau | G06Q 30/0269 |
| | | | | 705/14.66 |
| 9,097,552 | B2* | 8/2015 | Udeshi | G01C 21/30 |
| 9,219,788 | B1* | 12/2015 | Buron | G06Q 30/0269 |
| 10,354,336 | B1* | 7/2019 | Izrailevsky | G06Q 40/12 |
| 10,783,167 | B1* | 9/2020 | Dutta | G06F 16/24578 |
| 10,846,612 | B2* | 11/2020 | Keysers | G06N 20/00 |
| 11,294,936 | B1* | 4/2022 | Jaureguiberry | G06F 16/285 |
| 2005/0125148 | A1* | 6/2005 | Van Buer | G01C 21/3617 |
| | | | | 340/995.19 |
| 2010/0106603 | A1* | 4/2010 | Dey | G08G 1/096811 |
| | | | | 705/14.63 |
| 2011/0093340 | A1* | 4/2011 | Kramer | G06Q 30/02 |
| | | | | 705/14.58 |
| 2011/0125545 | A1* | 5/2011 | Lehmann | G06Q 10/109 |
| | | | | 707/769 |
| 2011/0137929 | A1* | 6/2011 | Lehmann | G06Q 10/109 |
| | | | | 707/769 |
| 2011/0208425 | A1* | 8/2011 | Zheng | G01S 19/14 |
| | | | | 706/46 |
| 2013/0137464 | A1* | 5/2013 | Kramer | H04W 4/021 |
| | | | | 455/456.3 |
| 2013/0345958 | A1* | 12/2013 | Paek | G01C 21/3697 |
| | | | | 701/400 |
| 2014/0162219 | A1* | 6/2014 | Stankoulov | G09B 19/167 |
| | | | | 434/65 |
| 2014/0274022 | A1* | 9/2014 | Bell | G06F 16/313 |
| | | | | 455/418 |
| 2014/0372022 | A1* | 12/2014 | Witmer | G01C 21/3841 |
| | | | | 701/423 |
| 2016/0055159 | A1* | 2/2016 | Connolly | G06F 16/285 |
| | | | | 707/734 |
| 2016/0097648 | A1* | 4/2016 | Hannah | G08G 1/0116 |
| | | | | 701/118 |
| 2016/0195405 | A1* | 7/2016 | Kreifeldt | G01C 21/3484 |
| | | | | 701/533 |
| 2016/0255139 | A1* | 9/2016 | Rathod | H04N 1/32101 |
| | | | | 709/203 |
| 2016/0353235 | A1* | 12/2016 | Williams | H04W 4/02 |
| 2017/0109437 | A1* | 4/2017 | Kudo | G06F 16/35 |
| 2018/0112995 | A1* | 4/2018 | Bortolussi | H04W 4/021 |
| 2018/0113914 | A1* | 4/2018 | Mehedy | G06F 16/248 |
| 2018/0174485 | A1* | 6/2018 | Stankoulov | G09B 19/167 |
| 2018/0285827 | A1* | 10/2018 | Dotan-Cohen | G06Q 10/063 |
| 2018/0350144 | A1* | 12/2018 | Rathod | G06Q 20/3224 |
| 2019/0005412 | A1* | 1/2019 | Matus | G07C 5/085 |
| 2019/0019233 | A1* | 1/2019 | Bhowmick | G06F 16/24578 |
| 2019/0139105 | A1* | 5/2019 | McGuire | G06Q 20/322 |
| 2019/0163874 | A1* | 5/2019 | Guo | G16H 15/00 |
| 2019/0166455 | A1* | 5/2019 | Hwang | H04W 4/029 |
| 2019/0176846 | A1* | 6/2019 | Movert | G06F 16/2455 |
| 2020/0005633 | A1* | 1/2020 | Jin | G06F 21/6254 |
| 2020/0056897 | A1* | 2/2020 | Williamson | G01C 21/3602 |
| 2020/0302372 | A1* | 9/2020 | Ghatak | G06Q 10/00 |
| 2020/0365013 | A1* | 11/2020 | Simon | H04W 76/10 |
| 2021/0116261 | A1* | 4/2021 | Guim Bernat | G05D 1/0212 |
| 2021/0215496 | A1* | 7/2021 | Sese | G01C 21/3697 |
| 2021/0306796 | A1* | 9/2021 | Otaki | H04W 4/022 |
| 2022/0187085 | A1* | 6/2022 | Luciani | G01C 21/3415 |
| 2023/0018382 | A1* | 1/2023 | Morita | G01C 21/3484 |
| 2023/0059450 | A1* | 2/2023 | Stroila | H04W 4/029 |
| 2024/0045912 | A1* | 2/2024 | Benkreira | G06F 16/9537 |
| 2024/0102811 | A1* | 3/2024 | Lynch | G01C 21/3691 |

FOREIGN PATENT DOCUMENTS

| | | |
|---|---|---|
| JP | 2005-228154 A | 8/2005 |
| JP | 2008-021045 A | 1/2008 |
| JP | 2009-042083 A | 2/2009 |
| JP | 2009-294860 A | 12/2009 |
| JP | 2011-034457 A | 2/2011 |
| JP | 2011-248832 A | 12/2011 |
| JP | 2015-145880 A | 8/2015 |
| JP | 2017-204081 A | 11/2017 |
| JP | 2018-155763 A | 10/2018 |
| JP | 2019-197460 A | 11/2019 |
| WO | 2016/067369 A1 | 5/2016 |
| WO | WO-2022115846 A1 * | 6/2022 |

OTHER PUBLICATIONS

International Search Report issued on Apr. 13, 2021 in corresponding International Application No. PCT/JP2021/005351; 4 pages.
Hung et al., "Clustering and aggregating clues of trajectories for mining trajectory patterns and routes", The VLDB Journal, 2015, 24 pages.

* cited by examiner

Fig. 3

| User ID | Time | Latitude | Longitude |
|---|---|---|---|
| 123456 | 2020/1/10 12:00 | 35.7036056 | 139.5769 |
| 123456 | 2020/1/10 12:10 | 35.7036056 | 139.5769 |
| 123456 | 2020/1/10 12:20 | 35.7036056 | 139.5769 |
| 123456 | 2020/1/10 12:30 | 35.7036056 | 139.5769 |
| 123456 | 2020/1/10 12:40 | 35.7028839 | 139.578 |
| 123456 | 2020/1/10 12:50 | 35.7028839 | 139.578 |
| 123456 | 2020/1/10 13:00 | 35.703319 | 139.575 |
| 123456 | 2020/1/10 13:10 | 35.7043122 | 139.5795 |
| 123456 | 2020/1/10 13:20 | 35.7043122 | 139.5795 |
| 123456 | 2020/1/10 13:30 | 35.7008483 | 139.5728 |
| 123456 | 2020/1/10 13:40 | 35.7008483 | 139.5728 |
| 123458 | 2020/1/10 12:20 | 35.696238 | 139.5682 |
| 123458 | 2020/1/10 12:30 | 35.696238 | 139.5682 |
| 123458 | 2020/1/10 12:40 | 35.696238 | 139.5682 |
| 123458 | 2020/1/10 12:50 | 35.696238 | 139.5682 |
| 123458 | 2020/1/10 13:00 | 35.696238 | 139.5682 |
| 123458 | 2020/1/10 13:10 | 35.696238 | 139.5682 |
| 123458 | 2020/1/10 13:20 | 35.696238 | 139.5682 |
| 123458 | 2020/1/10 13:30 | 35.696238 | 139.5682 |
| 123458 | 2020/1/10 13:40 | 35.7008483 | 139.5728 |

| Spot ID | Latitude | Longitude | Classification | Spot Name |
|---|---|---|---|---|
| 250 | 35.70361 | 139.5769 | Restaurant | Restaurant A |
| 251 | 35.70288 | 139.578 | CD DVD Video Store | CD DVD Shop B |
| 252 | 35.70332 | 139.575 | CD DVD Video Store | CD DVD Shop C |
| 253 | 35.70431 | 139.5795 | CD DVD Video Store | CD DVD Shop D |
| 254 | 35.70311 | 139.5788 | CD DVD Video Store | CD DVD Shop E |
| 255 | 35.70541 | 139.5808 | CD DVD Video Store | CD DVD Shop F |
| 256 | 35.70085 | 139.5728 | Park | Park E |
| 257 | 35.70288 | 139.578 | Park | Park F |
| 258 | 35.69624 | 139.5682 | Museum | Museum G |
| 259 | 35.70431 | 139.5795 | Museum | Museum H |
| 260 | 35.70459 | 139.5816 | Museum | Museum I |

| Cluster ID | Number of Constituent People | Common Spot/Area | | | | |
|---|---|---|---|---|---|---|
| 1 | 1,000 | A | B | C | D | E |
| 2 | 980 | A | B | C | D | F |
| .. | | | | | | |
| 100 | 100 | C | F | K | N | P |

Fig. 6

| Cluster ID | Number of Constituent People | Staying Time | CI Frequency | Staying Time Variance | CI Frequency Variance | Common Spot/Area | Maximum Staying Time | Minimum Staying Time | Maximum CI Frequency | Minimum CI Frequency |
|---|---|---|---|---|---|---|---|---|---|---|
| 1 | 1,000 | 4.5h | 5 | 0.1 | 0.2 | A | 10h | 0.5h | 10 | 2 |
| 2 | 980 | 4.5h | 5 | 0.1 | 0.2 | A | 10h | 0.5h | 10 | 2 |
| ⋮ | | | | | | | | | | |
| 100 | 100 | 6.0h | 3 | 0.3 | 0.1 | C | 12h | 0.3h | 3 | 1 |

142

GENERATION OF CLUSTERS BASED ON PLURAL USER DATA RELEVANT TO TRAVEL STOPS

CROSS-REFERENCE TO RELATED APPLICATIONS

This application is based upon and claims the benefit of priority from the prior Japanese Patent Application(s) No. 2020-045879, filed Mar. 16, 2020 and from PCT Patent Application(s) No. PCT/JP2021/005351, filed Feb. 12, 2021, the entire contents of all of which are incorporated herein by reference.

FIELD

The present disclosure relates to a cluster generation apparatus, cluster generation method, and cluster generation program which classify users based on position information for the users and information on a spot visited by the users.

BACKGROUND

With the recent proliferation of smartphones, it has become possible to easily obtain position information for users. Obtaining position information for users allows visualization of a flow of people; an analysis as to what people gather in what place or as to where they flow to or from for a grasp and analysis of places where people gather can be useful in regional development, cultural protection, or business.

For example, a method of visualizing a people flow using information of a GPS or the like and illustrating the flow of people on a map for the sake of supporting efficient operation of a city is known.

However, the known technique only analyzes the flow of people regarding where a visitor to a certain point comes or goes based on movement information for the people. The known technique does not include an idea of analyzing the data using information on a place visited.

SUMMARY

Therefore, an object of the present disclosure is to provide a cluster generation apparatus, a cluster generation method, and a cluster generation program that analyze information on spots visited in addition to movement information for people to analyze people who visit a certain spot, people who visit a certain area, people who visit multiple spots, etc., thereby allowing a grasp of these characteristics.

BRIEF DESCRIPTION OF THE DRAWING(S)

FIG. 3 is a diagram showing an example data structure of a user information DB 121.

FIG. 4 is a diagram showing an example data structure of a spot information DB 122.

FIG. 6 is a diagram showing an example of clustering based not only on commonality among spots visited by users but also on a staying time, the number of visits, etc.

DETAILED DESCRIPTION

In general, according to one embodiment, a cluster generation apparatus comprising: processing circuitry configured to: acquire position information and time information for a plurality of users; generate a cluster based on spots visited by the users by using the position information for the users, the cluster being a classification of the users; and generate, for each generated cluster, a movement route based on a history of movement of the cluster between the spots, from the time information and the position information for the users belonging to the cluster.

Hereinafter, a cluster generation apparatus, a cluster generation method, and a cluster generation program according to an embodiment of the present disclosure will be described with reference to the drawings. Note that the embodiment described below does not unduly limit the present disclosure recited in the claims. Also, not all the configurations described in the embodiment are essential components to the present disclosure. Further, in all the drawings for describing the embodiment, common components are marked with the same reference sign, and redundant descriptions thereof will be omitted.

Embodiment 1

Figure 1:
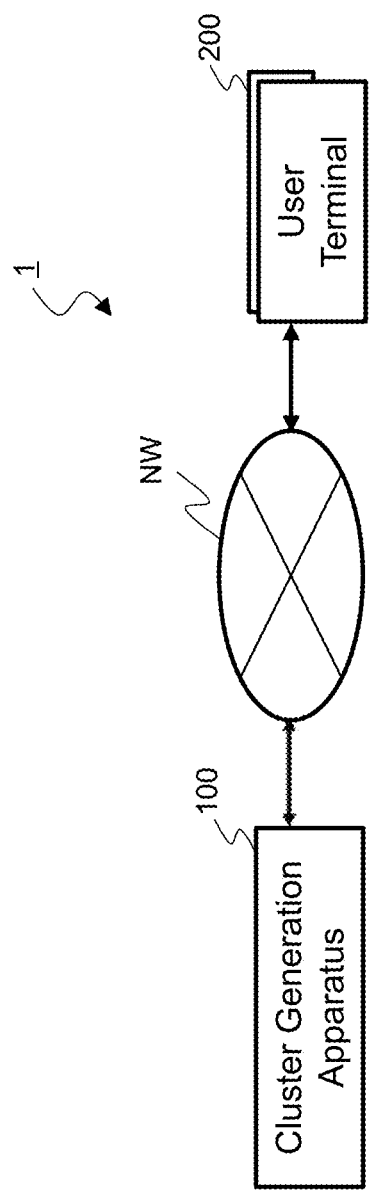
FIG. 1 is a diagram showing an example configuration of a cluster generation system of the present disclosure.

In Embodiment 1, a cluster that is a classification of users is generated from position information for users, time information, and spots visited by the users, and a visiting route to spots is displayed for each cluster. As shown in FIG. 1, a cluster generation system according to the present embodiment includes a cluster generation apparatus 100 and a user terminal 200.

The cluster generation apparatus 100 and the user terminal 200 are communicatively connected to each other via a network NW. The network NW includes a world area network (WAN), a local area network (LAN), or the like. The cluster generation system 1 periodically acquires position information for users and time information and generates a cluster from spots visited by the users.

The cluster generation apparatus 100 is managed by a business operator such as a telecommunications operator or a business operator who performs information analysis. The cluster generation apparatus 100 periodically acquires the position information for the users and the time information through the user terminal 200. The cluster generation apparatus 100, after grasping the spots visited by the users, generates a cluster, which is a classification of the users, on the basis of a spot visited by the users.

The user terminal 200 is used by the user. The user terminal 200 is a terminal device having a function of acquiring position information and a communication function, such as a smartphone or a tablet terminal. Note that the user terminal 200 does not always have the function of acquiring the position information by itself, and may be, for example, a combination of an IC card for identifying a user with an IC reading terminal placed at a spot, which is configured to acquire a visit time and position information for the user.

<A Configuration of a Cluster Generation Apparatus>

Figure 2:
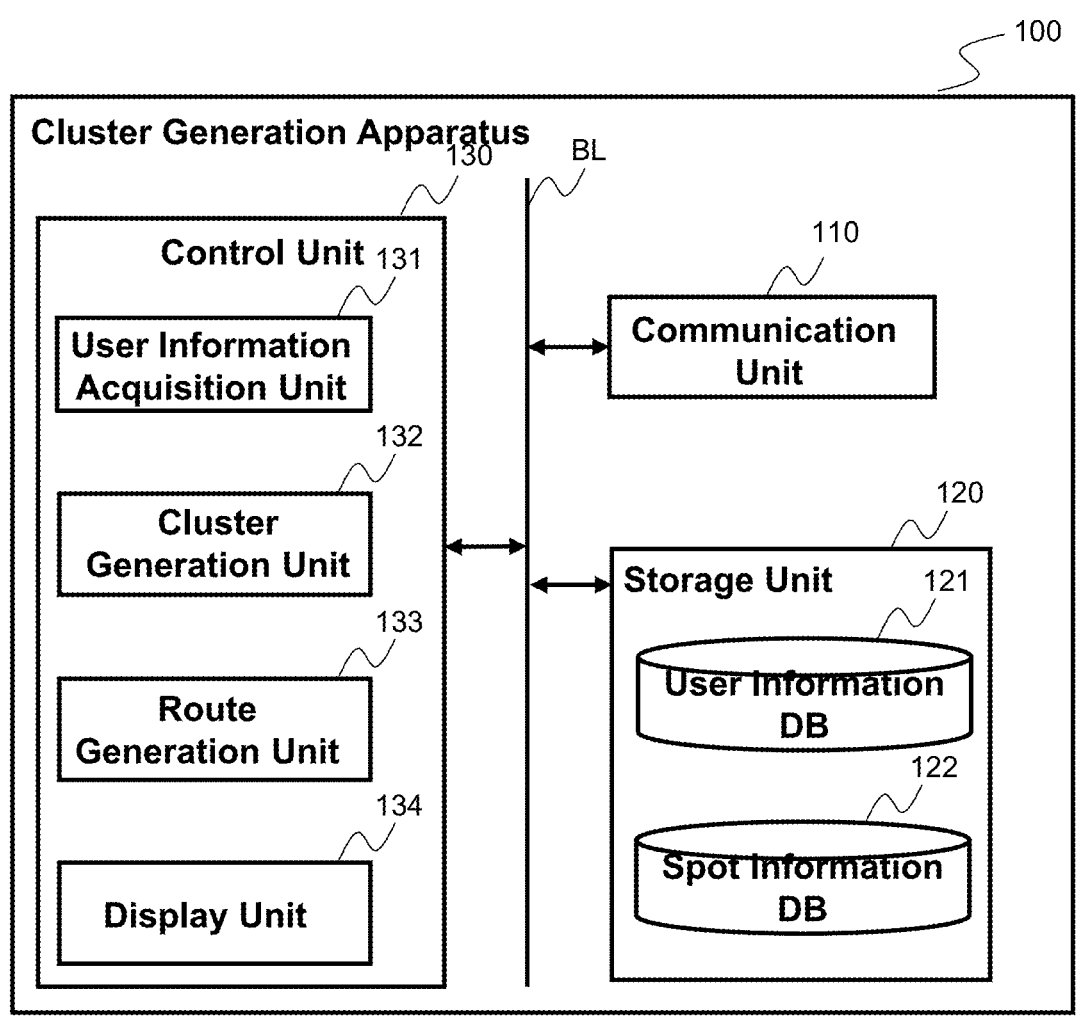
FIG. 2 is a diagram showing an example configuration of a cluster generation apparatus according to Embodiment 1 of the present disclosure.

Hereinafter, a configuration of the cluster generation apparatus 100 will be described in detail. As shown in FIG. 2, the cluster generation apparatus 100 includes a communication unit 110 that communicates with another apparatus, a storage unit 120 that stores various data, and a control unit 130 that controls the entire apparatus. These components are connected to each other by a bus line BL.

The communication unit 110 is a communication interface provided with a network interface card controller (NIC) for wired or wireless communication. The communication unit 110 communicates with the user terminal 200 via the network NW.

The storage unit 120 includes a random access memory (RAM), a read only memory (ROM), or the like. The storage unit 120 stores a program for executing various control processes, various data, or the like.

The storage unit 120 includes a user information DB 121 that stores a user ID for identifying a user, position information for the user acquired from the user terminal 200 via the communication unit 110, and time information that is a time when the position information has been acquired.

In addition, the storage unit 120 includes a spot information DB 122 that stores a spot ID for identifying a spot, position information, a spot name, and information such as a spot classification or attribute.

The control unit 130 includes a central processing unit (CPU) or the like. The control unit 130 executes the program stored in the storage unit 120, thereby controlling the overall operation of the cluster generation apparatus 100.

Hereinafter, a functional configuration of the control unit 130 will be described. The control unit 130 functions as a user information acquisition unit 131, a cluster generation unit 132, a route generation unit 133, and a display unit 134.

The user information acquisition unit 131 acquires position information for a user and time information from the user terminal 200 via the communication unit 110 and the network NW. The position information for the user is, for example, information such as latitude and longitude. The time information is information on a time when the position information has been acquired.

For the acquisition of the position information for the user, information of a global positioning system (GPS) or the like installed on a smartphone, smartwatch, or the like that is carried by the user may be used.

Alternatively, the position information may be acquired in response to a user having his/her own terminal read through a terminal such as a magnetic reader or an IC reader placed at a spot or the like.

The user information acquisition unit 131 may also acquire the position information based on information posted on a social networking service (SNS).

The user information acquisition unit 131 periodically acquires the position information and the time information from the user at evenly spaced time intervals. Shorter intervals at which the position information for the user is acquired will allow a more detailed analysis and thus are desirable.

On the other hand, longer time intervals at which the position information is acquired can reduce the burden on the system and the network while shorter intervals will allow a better chance of analyzing users' action in more detail. Therefore, the time interval may be set with a subject of the analysis and the burden on the system taken into account.

The user information acquisition unit 131 stores the position information acquired from the user together with the user ID and the acquired time information in the user information DB 121. It is desirable that the position information for the user is temporarily stored in the storage unit 120 so that the cluster generation apparatus 100 can allow a cluster analysis to be conducted from various viewpoints.

The cluster generation unit 132 generates a cluster that is a classification of users on the basis of spots visited by users. Note that the term "spot" refers to a given location that can be identified by latitude and longitude, such as a store or a facility. When there is no distinctive facility or the like, a virtual spot may be placed at evenly spaced intervals.

The cluster generation unit 132 first grasps which spot the user has checked in, namely, visited, on the basis of information acquired from the user information acquisition unit and information of the spot information DB 122.

In order for the cluster generation unit 132 to determine a user's spot visit, for example, the position information, such as latitude and longitude, for the user is compared with the position information, such as the latitude and longitude, for the spot, and a visit is determined when the locations match.

If strict matching for the position information is applied to the determination of the visit, it may be determined that the user has not visited any spot. Therefore, a certain threshold L may be set in advance so that the user can be regarded as having visited a spot when the distance between the spot and the user is L or less. This makes it possible to absorb an error in the position information. In addition, a general algorithm may be used to determine that the user has visited the spot.

When the cluster generation unit 132 determines a user's spot visit, the determination is made based on the matching for the position information between the user and a spot; in this case, the determination of a visit may be made simply based on the matching, or a determination of passage, visit, or utilization may be separately made based on consecutive information-matching.

For example, when the user information acquisition unit 131 acquires the position information for the user at evenly spaced time intervals, the matching for the position information between the user and a spot may indicate the user not visiting but merely passing through. This case may be determined as passage. In addition, when the number of consecutive matchings for the position information between the user and a spot is a given number of times (a first threshold value) or more, it may be determined that the user has visited the spot. Further, in a spot such as a movie theater, a hot spring facility, or a theme park, when the number of consecutive matchings for the position information between the user and the spot is a given number of times (a second threshold value) or more, it may be determined that the user has utilized the spot. Moreover, when the number of consecutive matchings for the position information between the user and a spot is a given number of times (a third threshold value) or more, it may be determined that the user is working at the spot.

That is, in continuous time, the number of matchings for the position information between the user and a spot being less than the first threshold value may be determined as passage, the number of matchings being the first threshold value or more and less than the second threshold value may be determined as visit, and the number of matchings being the second threshold value or more and less than the third threshold value may be determined as utilization. Each threshold value may be set for each spot.

The cluster generation unit 132 may take a moving method of the user into account in determining that the user has visited the spot. For example, the user information acquisition unit 131 acquires position information for the user at evenly spaced time intervals; in this case, a traveled distance based on the position information for the user over consecutive time may be used to estimate a moving speed from the traveled distance per unit time and determine whether the user is moving on foot or by automobile, train, or another moving method. Then, at least when it is determined that the user is moving by automobile, train, or the like, even if the position information for the user and the spot match, the cluster generation unit 132 may be configured not to determine that the user has visited the spot because the user has only passed through the spot and has not visited it.

Regarding the acquisition of the position information for the user, when the acquisition is based on terminals such as a magnetic reader and an IC reader placed at the spot, for example, the cluster generation unit 132 may determine that the user has visited the spot based on the fact that a user's terminal has been read by these terminals.

The cluster generation unit 132 generates a cluster, which is a classification of the user, on the basis of the spot visited by the user. The cluster generation unit 132, for example, uses hierarchical clustering, non-hierarchical clustering, or known algorithms to generate a cluster based on the commonality among spots visited by the users (commonality among users who visited the spots from the perspective of the spots). In this case, the cluster generation unit 132 may perform clustering with a target number of clusters to generate set as M and then generate M clusters from clusters with a large number of common spots and users.

The cluster generation unit 132 may generate a cluster in consideration of the number of visits to a spot, a visit time, a staying time, the commonality among spot classifications, etc. in performing the clustering. In addition, the cluster generation unit 132 may generate the cluster in consideration of a total staying time, an average staying time, the number of times of introduction or citation in media such as television, magazines, the Internet, and an SNS, a mobile unit, etc.

Furthermore, in performing the clustering, the cluster generation unit 132 may generate the cluster by assigning a weight to a factor and then taking it into account, such as commonality among spots, the number of visits to a spot, a visit time, a staying time, commonality among spot classifications, a total staying time, an average staying time, the number of times of introduction or citation in media such as television, magazines, the Internet, and an SNS, a mobile unit, purchase data, prices of commodities or services carried by spots, or types of the commodities or services.

The cluster generation unit 132 may give a high value to a meaningful location among spots, i.e., a location having a high rarity. For the rarity, a high value is given when some users take a common action. For example, a high rarity may be given to a location having a small number of visits. Stations, convenience stores, or the like as having many visitors are given a low rarity. On the other hand, a location having a small number of visits, such as a bookstore that is popular among people having a specific hobby or a live house, is given a high rarity.

In addition, for example, a high rarity may be given to a location having a long staying time in the spot or a large number of visits per person. A high rarity may be given to a spot having a usual staying time of within 15 minutes where only some users stay for 60 minutes or more. That is, in a case where users of a certain station normally use the station to take a train therefrom while some users spend more visiting time to shoot the train, users who stay for 60 minutes or more may be clustered as a pseudo-spot A2 that is different from a usual spot A.

In addition, for example, with respect to a certain spot, a high rarity may be given to a spot having fewer related spots.

The cluster generation unit 132 when generating a cluster may select only spots having a rarity exceeding a given threshold value to generate the cluster based on the commonality among the spots visited by the users.

The cluster generation unit 132 when generating a cluster may set a high score for a cluster that includes many spots having a high rarity to preferentially generate a cluster having a high score or may sort clusters having higher scores after the cluster generation to extract a cluster.

When the cluster generation unit 132 generates a cluster, hierarchical clustering, non-hierarchical clustering, or a known clustering algorithm may be applied.

When the cluster generation unit 132 generates a cluster, the cluster may be generated based on an area formed by collecting several spots instead of based on common spots. In this case, the cluster generation unit 132 may perform clustering using information such as position information for an area, a classification and attribute of spots belonging to the area, the number of visits of a user, and the like, similar to the clustering based on a spot.

The cluster generation unit 132 when generating a cluster may limit the range of the spots or area to be classified and generate a cluster based on the spots or area within the limited range. The cluster generation unit 132 may also generate a cluster within a designated time with a given time range. In this case, the cluster may be generated with a range of days of the week, time of day, etc.

Furthermore, the cluster generation unit 132 when generating a cluster may generate the cluster in consideration of the number of visits to the spots or area, a visit time, a staying time, etc.

Clustering based on a given factor such as commonality among spots makes it possible to grasp characteristics for each cluster or spot.

The route generation unit 133 generates, for the cluster generated by the cluster generation unit 132, a movement route indicating how users have moved through the spots and/or areas belonging to the cluster.

The route generation unit 133 when generating the movement route plots, for example, a movement relationship between spots for each user to generate the route. That is, provided that there are five spots A to E in the cluster, the route generation unit 133 generates a matrix of movement patterns of A to A (stay), A to B, A to C, . . . , B to A, B to B (stay), B to C, . . . , E to D, and E to E (stay) for each action of the users. Then, the route generation unit 133 takes, for example, the most frequent movement pattern as a route to generate a movement route of the users belonging to the cluster.

By generating the movement route in this manner, it is possible to generate a route while keeping track of the relationship between the pre-movement and post-movement between the spots.

Generating a route using a movement relationship between the spots can reduce the amount of calculation compared to generating a movement route from the position information for the users. In addition, the use of the movement relationship between the spots makes it possible to perform analysis based on common spots visited by the users which constitute the generated cluster.

The route generation unit 133 when generating a movement route may generate the movement route not only after the clustering but also at the same time as the clustering.

In the generation of the movement route, a main movement route and a sub movement route may be separately generated instead of generating only one route. For example, routes with more frequent movement patterns in the movement relationship between the spots may be connected and taken as the main movement route to generate, and after setting a threshold value T, a route with a movement of more than T may be taken as the sub movement route to generate. Further, the number of the sub movement routes may not be one, and a plurality of sub movement routes may be generated.

The generation of the movement route is not limited to the generation using the movement relationship between the spots as described above, and a known route generation algorithm may be used to generate the movement route of the spots belonging to the cluster.

Regarding the route generated by the route generation unit 133, the display unit 134 creates a movement route between the spots and/or areas belonging to the cluster using a network diagram and displays it. In this case, the display unit 134 may display only the main movement route or may display both the main movement route and the sub movement route.

The display unit 134 when displaying both the main movement route and the sub movement route may display them in different line types and/or colors so that the main movement route and the sub movement route can be distinguished from each other. This makes it possible to visually grasp the movement route for the cluster at a glance, including the main and sub movement routes.

Further, in addition to displaying the movement route between the spots in the network diagram, the display unit 134 may also show the movement route on a map with the spots indicated thereon. Displaying the movement route on the map allows a user to visually grasp the sense of distance for the movement route and also visually grasp what spot is nearby.

When the movement route is displayed on the map, the route may be displayed along a road between the spots using an existing algorithm or the like.

A Specific Example of a Database (DB) Stored in a Storage Unit

FIG. 3 shows a specific example of a user information DB 121. The user information acquisition unit 131 periodically acquires the position information and the time information from the user at evenly spaced time intervals. Then, the user information acquisition unit 131 stores a user ID of a user for which position information has been acquired, a time of the acquisition, the position information for the user (latitude and longitude) in the user information DB 121. Information stored in the user information DB 121 is not limited to the above, and other information such as the age (generation), sex, and residence area of the user may be stored.

FIG. 4 shows a specific example of a spot information DB 122. In the spot information DB 122, an identification (ID) for identifying a spot, position information (latitude and longitude) for the spot, a spot name (shop name or the like), and a classification (classification of the spot, such as restaurant, theme park, or station) are stored. Further, the spot information DB may store other information such as an opening time and an average budget of the spot, or may save a link to an official homepage, introduction page or the like for the spot so that various kinds of information on the spot can be acquired.

A Specific Example of Cluster Generation

The cluster generation unit 132 generates a cluster, which is a classification of users, based on spots visited by the users. The cluster generation is performed using hierarchical clustering, for example, as follows.

In the hierarchical clustering, for example, spot clustering is performed by regarding commonality among spots from the perspective of a user (commonality among users from the perspective of a spot) as distance or similarity. Specifically, for example, provided that there are three spots of A, B, and C with IDs of users who have visited the spots being A=(01, 02, 03, 04, 05), B=(01, 02, 03, 04, 06), and C=(01, 02, 07, 08, 09), respectively, clustering is first performed on the spots A and B as having a high user commonality (high similarity), followed by clustering on the spots of A+B and C. As candidates for hierarchical clustering, patterns of A+B+C, A+B, C, A, and B are generated.

The cluster generation unit 132 performs hierarchical clustering while combining similar spots to generate a cluster. In this case, it is considered that a cluster having few common spots only visits a common location such as a station or a convenience store and has few characteristics. Therefore, a cluster having many common spots (having few common users) may be extracted to generate a final cluster.

In addition, in order to select a characteristic cluster, the clusters may be sorted in descending order of value obtained by multiplying the number of common spots by the number of users. In addition, an index such as the total sum of staying time in common spots may be used, or a factor for extracting another characteristic cluster may be taken into account. Further, these indices may be used to extract the top M clusters and form a cluster.

In the cluster generation unit 132, cluster generation may be performed using not only hierarchical clustering but also non-hierarchical clustering or a known clustering algorithm.

The cluster generation unit 132 may generate a cluster using a meaningful location, i.e., rarity. For example, a rarity of 10 is assigned to a spot where only some users visit (the number of users visiting is a or more and b or less), and a rarity of 1 is assigned to the other spots. When a cluster is generated, a rarity may be calculated based on the spots included in the cluster to sort the generated clusters in descending order of rarity. In this case, M clusters may be extracted in descending order of rarity.

Also, when rarity is considered, the rarity may be given in consideration not only of the number of visits by users but also factors such as a visit time, a staying time, commonality among spot classifications, a total staying time, an average staying time, the number of times of introduction or citation in media such as television, magazines, the Internet, and an SNS, a mobile unit, purchase data, prices of commodities or services carried by spots, and types of the commodities or services.

Figure 5:
FIG. 5 is a diagram showing an example of clustering based on commonality among spots visited by users.

FIG. 5 shows a specific example 141 of a cluster generated from the clustering by the cluster generation unit 132. For example, in a case where a target is to generate 100 clusters, the following is an example in which 100 clusters are generated from a cluster having many common spots and a large number of constituent people.

The cluster generation unit 132 may perform the clustering in consideration of not only commonality among spots (commonality among users) but also factors such as a visit time, the number of visits, a staying time, commonality among spot classifications. In this case, the cluster generation unit 132 may perform the clustering after assigning a weight to each of the factors such as commonality among spots (commonality among users), a visit time, the number of visits, a staying time, commonality among spot classifications.

FIG. 6 shows a specific example 142 in which clustering is performed in consideration of commonality among spots (commonality among users) as well as a staying time, a visit frequency (shown as CI frequency in FIG. 6), staying time variance, visit frequency variance, maximum staying time, minimum staying time, maximum visit frequency, and minimum visit frequency. Although omitted in FIG. 6, each cluster actually has a plurality of spots as in FIG. 5, and for example, a cluster represented by cluster ID1 in FIG. 6 has not only the spot A but also the spots of B, C, D, and E as factors.

A Specific Example of Route Generation

The route generation unit 133 generates, for the cluster generated by the cluster generation unit 132, a movement route indicating how the users have moved through spots and/or areas belonging to the cluster. For example, the route generation unit 133 uses a movement relationship between spots to generate a route.

Figure 7:
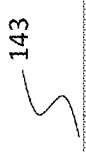
FIG. 7 is a diagram showing an example of relationship of movement between spots.

FIG. 7 shows a specific example of the movement relationship between spots. For example, it is assumed that six spots of A to F belong to a certain cluster. In this case, the movement route of each user from the spots A to F is inputted in the movement relationship between the spots. For example, if the user in the spot A moves to the spot E, 1 is added to the cell at A row, E column. Also, if the user in the spot A remains in the spot A, 1 is added to the cell at A row, A column.

When the route generation unit 133 generates a movement relationship between spots, the movement relationship may be generated at an optionally divided time (a given time from one date and time to another date and time).

FIG. 7 shows a specific example 143 of a movement relationship between spots. In this matrix, when A is set as a starting point, a stay in A has a score of 4, movement to B has a score of 1, movement to C has a score of 1, movement to D has a score of 2, movement to E has a score of 4, and movement to F has a score of 10. Therefore, the movement from A to F is the most majority and is grasped as the main movement route.

Similar to the above, the most majority movement when tracked will be B to F, C to D, D to E, E to A, and F to B. Connecting the above routes results in the route C to D to E to A to F to B. The route generation unit 133 grasps this route as a main movement route.

Next, in the movement relationship 143 between the spots shown in FIG. 7, a route that has not been grasped as the main movement route but has many movements may be grasped as a sub movement route. For example, when a threshold value is set to 10, a route that has not been grasped as the main movement route but has movement with a score of 10 or more is grasped. Then, the routes of B to C and C to B can be grasped. Therefore, in addition to the main movement route, the routes of B to C and C to B are grasped as sub movement routes.

A Specific Example of Route Display

Figure 8:
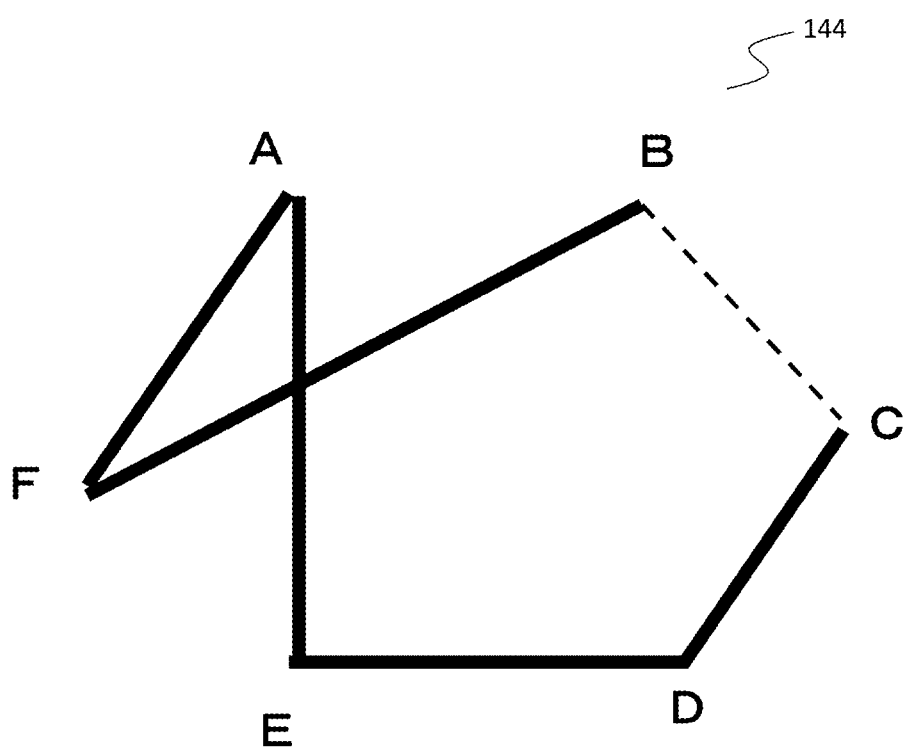
FIG. 8 is a diagram showing an example of network diagram showing a movement route.

Regarding the route generated by the route generation unit 133, the display unit 134 creates a movement route between the spots and/or areas belonging to the cluster using a network diagram and displays it. FIG. 8 shows a specific example 144 of the network diagram. This network diagram indicates the main movement route by a solid line and the sub movement route by a broken line in relation to the movement relationship 143 between the spots in FIG. 7.

In FIG. 8, for example, only the main movement route or only the sub movement route may be shown. Also, an arrow indicating a movement direction such as C to D or D to E may be included in the display.

Figure 9:
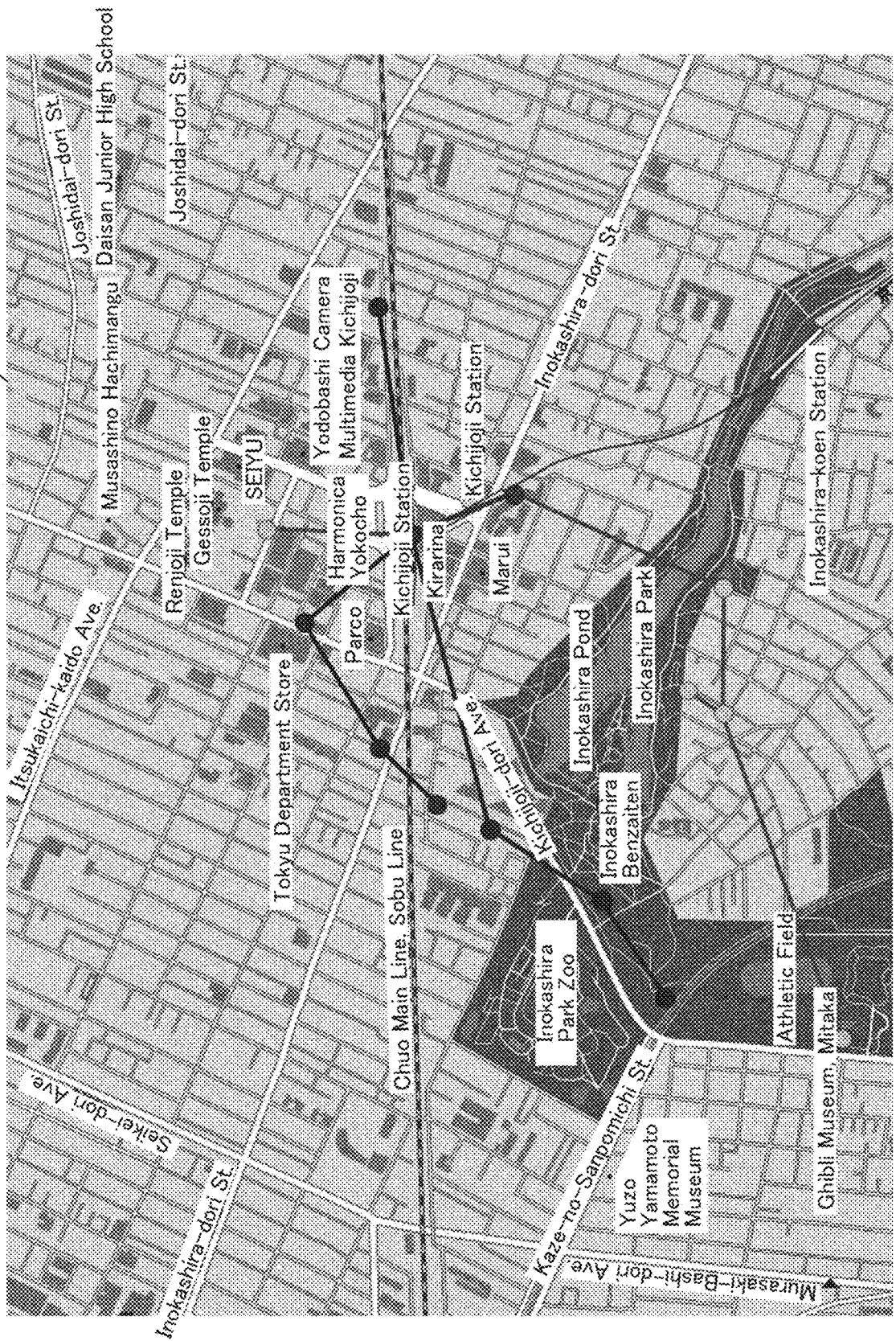
FIG. 9 is a diagram showing an example display of a movement route on a map.

The display unit 134 may show the movement route on a map. FIG. 9 shows a specific example 145 of the movement route indicated on the map. In this specific example, routes of three clusters are simultaneously displayed on the map. A route of one cluster may be displayed on the map, or a route of any selected multiple clusters may be displayed.

(Processing Flow)

Figure 10:
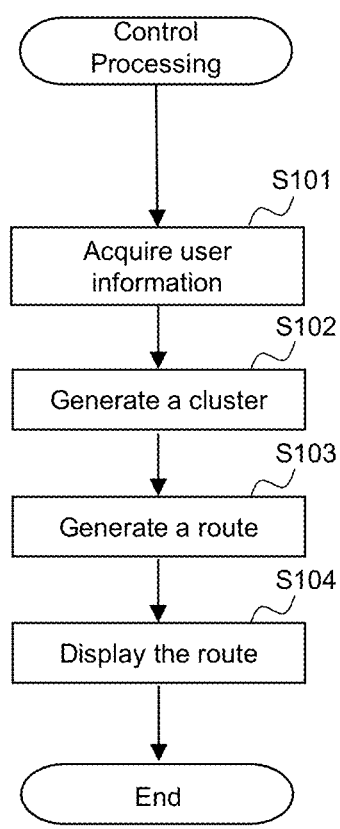
FIG. 10 is a flowchart illustrating an example of a processing flow in the cluster generation apparatus according to Embodiment 1.

FIG. 10 shows a processing flow of a cluster generation apparatus in Embodiment 1 of the present disclosure.

The user information acquisition unit 131 acquires position information for a user and a time. Then, the user information acquisition unit 131 stores the acquired information in the user information DB 121 (step S101).

The cluster generation unit 132 grasps which spot the user has visited using the position information for the user, the time information, and information on spots. Then, the cluster generation unit 132 generates a cluster using information on the user who has visited the spot (step S102). Common spots that the users have visited in common belong to each cluster.

Regarding the common spots belonging to the cluster, the route generation unit 133 generates a movement route of the users using the movement relationship between the spots (step S103). In this case, the route generation unit 133 may generate not only a main movement route but also a sub movement route.

The display unit 134 displays the movement route of the users using a network diagram (step S104). In this case, the display unit 134 may display the movement route on a map.

Advantageous Effect

According to the present embodiment, it is possible to analyze how people gather in a spot or an area by using the position information for the users and information on spots visited by the users. Furthermore, by generating the cluster and analyzing it, it is possible to analyze a possible spot that a user who has visited a certain spot is likely to visit, as well as characteristics of an action route for each region, or the like.

By performing such an analysis with classification into a cluster, it is possible to grasp what cluster of people gathers in a certain spot or area. For example, by reference to how a similar cluster acts in another spot or area, it is possible to help the invigoration of local economy and the development of a city.

In addition, in the present embodiment, it is possible to grasp individualities and characteristics of spots, areas, clusters, etc. without acquiring personal information, which is information for identifying an individual, which makes it possible to analyze information and make recommendations such as marketing under an environment that is less susceptible to restrictions by the law such as the Acts on the Protection of Personal Information.

Further, the analysis of the present embodiment also makes it possible to identify a place of work or a place of residence based on the grasping of a staying time and the number of visits, which in turn makes it possible to further proceed with the analysis. It is also possible to perform analysis by day of the week or time zone, or by mobile unit. Further, referring to the information introduced by the media makes it also possible to analyze an economic effect due to the media.

Embodiment 2

Embodiment 2 further includes a function of displaying a summary of a spot, such as the number of visitors to the spot or an average staying time, using information acquired from users. Note that the entire system configuration is the same as that of the cluster generation system shown in FIG. 1.

<A Configuration of a Cluster Generation Apparatus>

Figure 11:
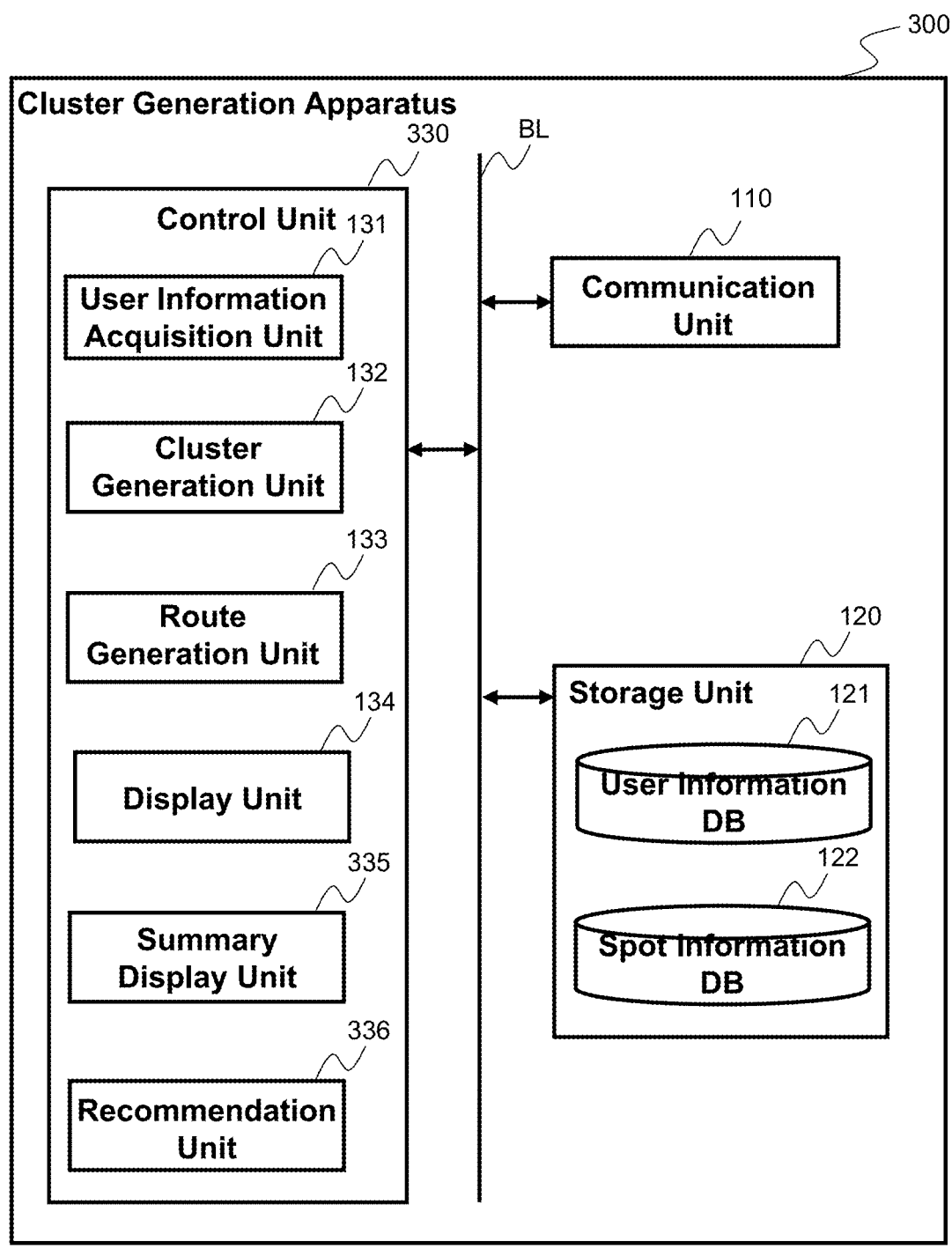
FIG. 11 is a diagram showing an example configuration of a cluster generation apparatus according to Embodiment 2 of the present disclosure.

FIG. 11 shows a configuration of a cluster generation apparatus 300 according to the present embodiment. The configurations of the communication unit 110 and the storage unit 120 are the same as those of the cluster generation apparatus 100. The user information acquisition unit 131, the cluster generation unit 132, the route generation unit 133, and the display unit 130 in a control unit 330 have the same configurations as those in the control unit 130 of the cluster generation apparatus 100, and the control unit 330 further includes a summary display unit 335 and a recommendation unit 336.

The summary display unit 335 uses the information acquired from the users to create and display a summary of the spot. Specifically, the summary to create includes the number of visitors to the spot, a total staying time, an average staying time per user, an average number of visits per user, the number of times of introduction/citation in media such as television, magazines, the Internet, and an SNS, a cluster having a strong relationship with the spot, another spot having a strong relationship with the spot, and a classification or attribute of such a spot as having the strong relationship with the spot.

The summary display unit 335 analyzes and calculates the number of visitors to the spot, the total staying time, the average staying time per user, and the average number of visits per user on the basis of the user's spot visit-determination made by the cluster generation unit 132 based on the information acquired from the users.

The summary display unit 335 selects a cluster having a strong relationship from among clusters that include the spot in question as a common spot. For example, the pre-specified top N clusters having a large number of persons belonging to each cluster may be selected as the cluster having a strong relationship. In addition, for example, a cluster having a large number of visits, a cluster having a long total staying time, a cluster having a large number of visits per person, or a cluster having a long staying time per person may be calculated as the cluster having a strong relationship.

In addition, the summary display unit 335 may select, from among the clusters having a strong relationship obtained in the manner described above, a spot that is a movement destination or a movement source to the spot concerned as a spot having a strong relationship.

In the summary display unit 335, the same classification or attribute as that of the spot concerned may be selected with respect to the classification or attribute of the spot having a strong relationship, and the classification or attribute included in the spot having a strong relationship may be selected.

The summary display unit 335 performs the spot analysis as described above to create a spot summary. And, for example, when a user selects a spot, the summary display unit 335 displays a spot summary related to this spot.

The summary display unit 335 may analyze an area to create and display an area summary. The area is a range including a plurality of spots within a given spread, for example, within a radius of 1 km from a town, a city, a prefecture as well as a train station in administrative district. The summary display unit 335 then displays the number of spots included in the area, a total staying time, an average staying time per person, an average number of visits per person, a major cluster, a spot or cluster having a long staying time, a spot or cluster having a long average staying time per person, a spot or cluster having a high average number of visits per person, etc.

The summary display unit 335 may access information offered on a network such as the Internet to display a spot that has been introduced many times on television, in magazines, etc.

The summary display unit 335 may use information on a cluster to which a spot belonging to the area belongs to display a cluster related to the area. In this case, the top N highly-related clusters may be displayed.

The summary display unit 335 may analyze a major cluster and create an area summary based on, for example, the number of users belonging to the cluster and the number of common spots included in the cluster.

The summary display unit 335 may perform the area analysis as described above to create and display the area summary.

The summary display unit 335 may create and display a cluster summary after analyzing the cluster and estimating an attribute of the cluster. In addition, the summary display unit 335 may create and display, for the users included in the cluster, a total staying time, an average staying time per person, an average number of visits per person, a spot having a long average staying time per person, a spot having a high average number of visits per person, a main action route, etc.

The summary display unit 335 may acquire, from the users, information on sex, age, place of residence, appearance of the user, clothes that the user often wears, or the like and use these pieces of information to create and display a male-to-female ratio, a generation ratio, a main place of residence, an average appearance, etc. for the cluster as a cluster summary.

When the summary display unit 335 calculates the spot summary, the area summary, and the cluster summary, the analysis may be performed after specifying a range of dates and times in advance, such as from when to when.

Displaying the summary in this manner allows the information to be grasped at a glance.

The recommendation unit 336 makes a recommendation after performing the cluster analysis. For example, assuming that the owner of a spot receives the recommendation, in response to the summary display unit 335 analyzing a cluster highly related to a certain spot, the recommendation unit 336 analyzes the spot regarding what spot the user further visits, what commodities or services a store visited by the user deals with, what commodities or services the user purchases, or the like. Thus, a commodity, a service, or the like to be handled at the spot concerned may be recommended or a store or the like to affiliate with may be recommended.

For example, assuming that a person in charge of an association for regional development receives a recommendation, in response to the summary display unit 335 analyzing a cluster highly related to a certain area, the recommendation unit 336 analyzes the area regarding what spot the user visits, what commodities or services a store visited by the user deals with, what spot in another area the user visits, or the like. Thus, in the spot concerned, a spot not in the area which the user is likely to use may be recommended, and a commodity or a service that the user is likely to purchase may be recommended.

For example, assuming that a user receives a recommendation, the recommendation unit 336 analyzes a cluster to which the user belongs regarding what spot another user belonging to the cluster concerned visits, what commodity or service a store visited deals with, or the like in the summary display unit 335. Thus, another spot that a user has not visited may be recommended to the user, and a commodity or a service may be recommended.

Through the cluster analysis as described above, the recommendation unit 336 may recommend a type of a spot, a store, or a facility, a type of a commodity or a service, or the like.

SPECIFIC EXAMPLES

Figure 12:
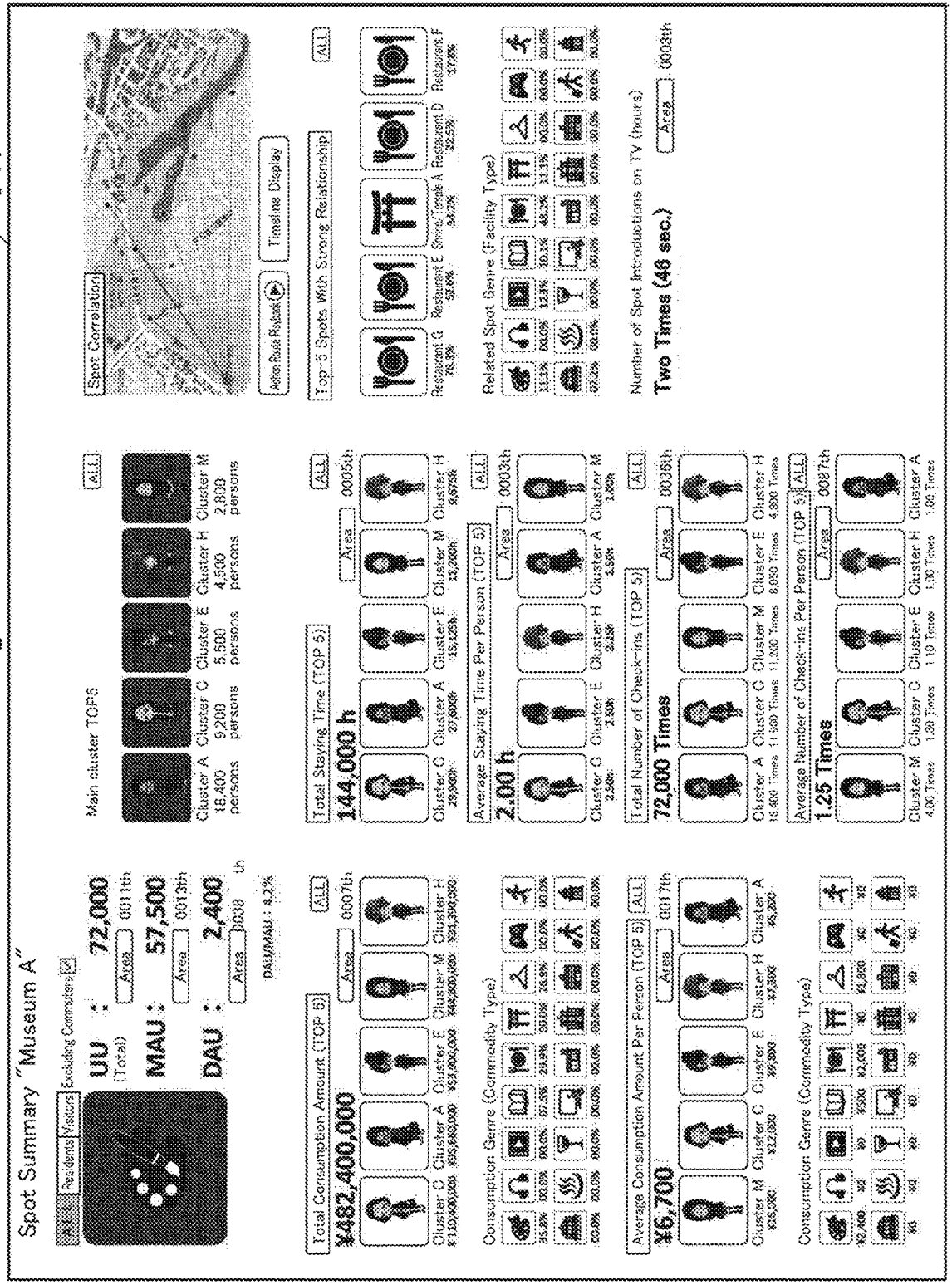
FIG. 12 is a diagram showing an example of spot summary.

FIG. 12 shows a specific example of a spot summary that the summary display unit 335 displays. The summary display unit 335 displays the spot summary, thereby making it possible to visually show different utilizations of a spot employed by different clusters having different action patterns. As shown in FIG. 12, the summary display unit 335 may display a total number of visits, a total staying time, an average staying time per person, or an average time of visit per person. The summary display unit 335 may also display clusters that have spot A in common and a value for each cluster. In addition, a cluster having a strong relationship, a spot having a strong relationship, a classification or attribute having a strong relationship may also be displayed together.

The summary display unit 335 displays a spot summary based on the cluster analysis for each spot, thereby making it possible to analyze a group of users visiting the spot concerned and how the spot is utilized by the users, which in turn enables a comparison with another spot or area.

Figure 13:
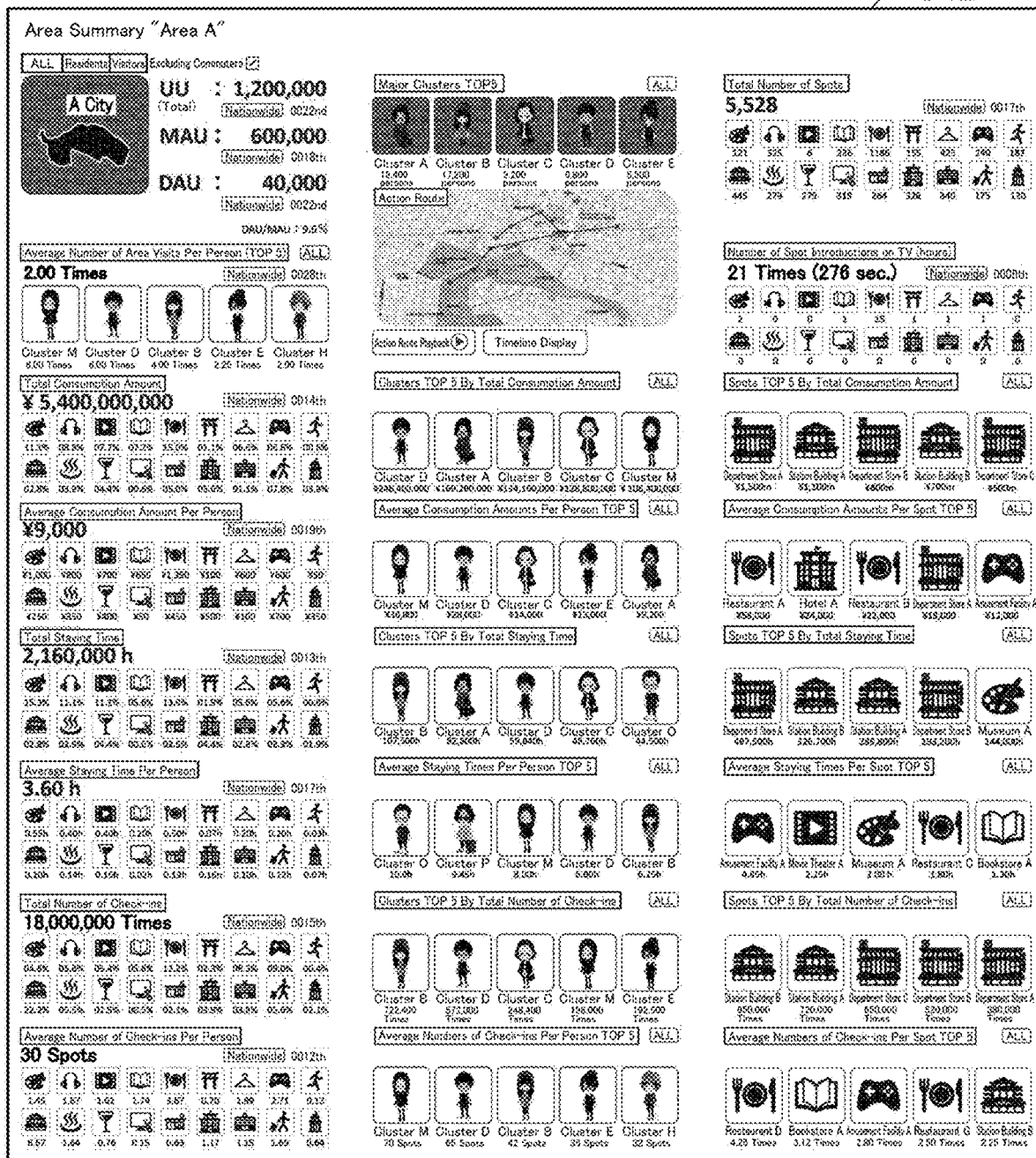
FIG. 13 is a diagram showing an example of area summary.

FIG. 13 shows a specific example of an area summary that the summary display unit 335 displays. The summary display unit 335 displays the area summary, thereby making it possible to visually show what spots and clusters constitute the area. As shown in FIG. 13, the summary display unit 335 may display a total number of spots, a total staying time, an average staying time per person, or an average number of visits per person. The summary display unit 335 may also display a value for each spot belonging to the area. Further, the summary display unit 335 may display a major cluster in the area concerned, a spot having a long total staying time, a spot having a long average staying time per person, a spot having a high average number of visits per person.

The summary display unit 335 displays an area summary based on the cluster analysis for each area, thereby making it possible to analyze a group of users visiting the area concerned and how the spot is utilized by the users, which in turn enables a comparison with another spot or area.

Figure 14:
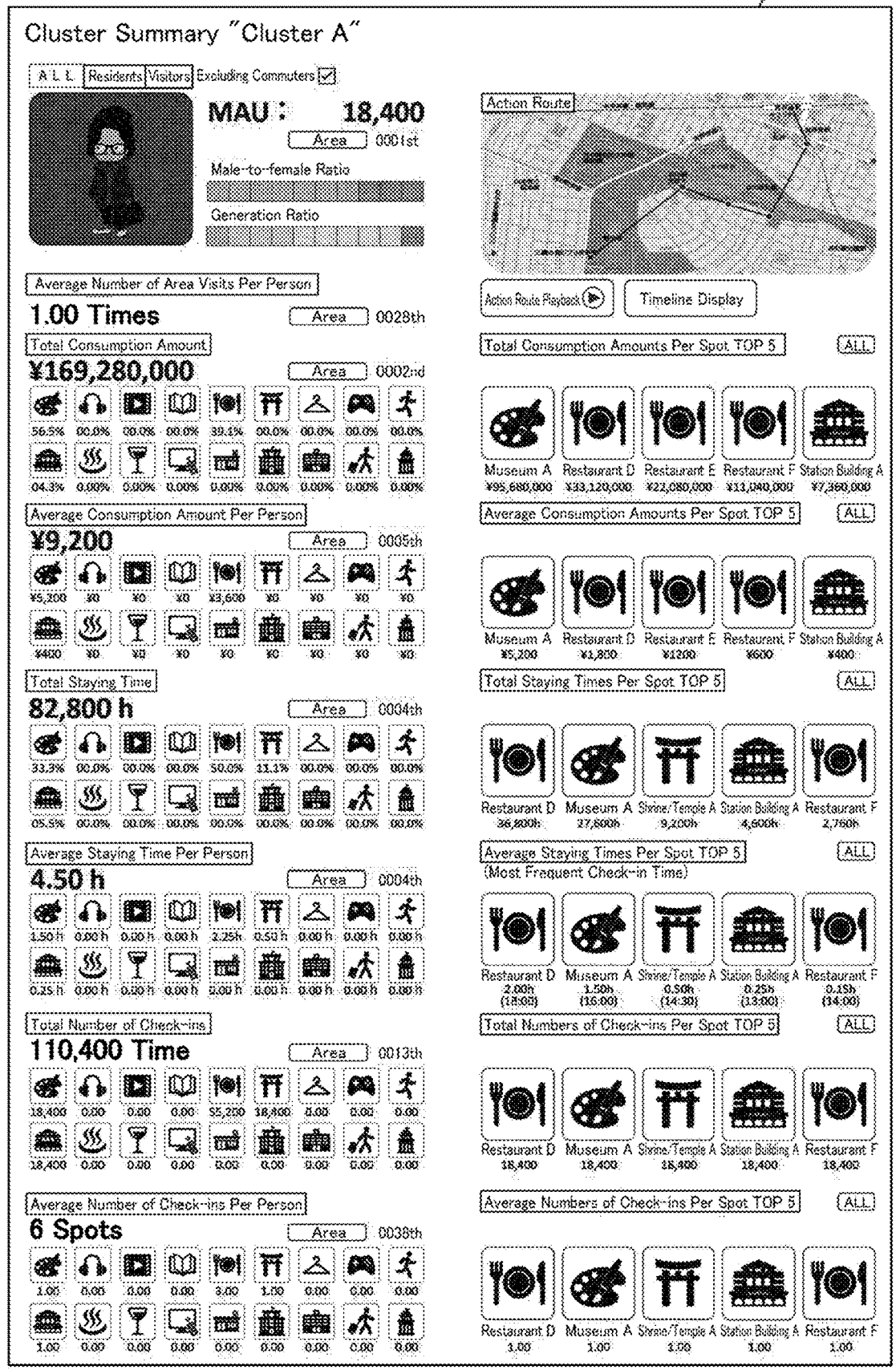
FIG. 14 is a diagram showing an example of cluster summary.

FIG. 14 shows a specific example of a cluster summary that the summary display unit 335 displays. The summary display unit 335 displays the cluster summary, thereby making it possible to visually show an action pattern of the cluster with respect to a common spot. As shown in FIG. 14, the summary display unit 335 may display not only the number of users belonging to the cluster, a male-to-female ratio, a generation ratio, and a region of residence but also a total staying time, an average staying time per person, an average number of visits per person, etc. The summary display unit 335 may also display these values for each spot. Further, the summary display unit 335 may display an average appearance of the cluster, a spot having a long average staying time per person, a spot having a high average number of visits per person, or a movement route.

(Processing Flow)

Figure 15:
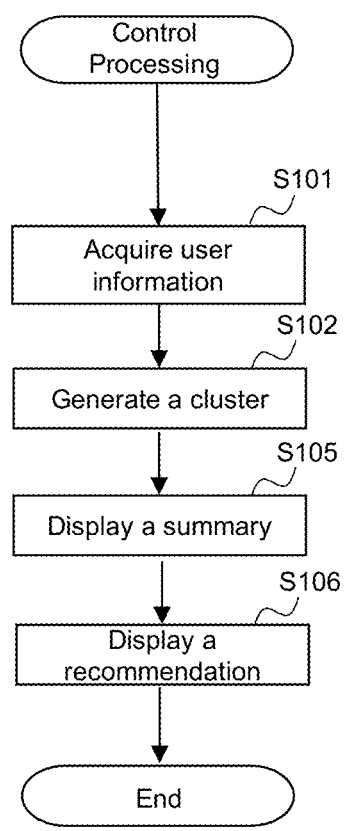
FIG. 15 is a flowchart illustrating an example of a processing flow in the cluster generation device according to Embodiment 2.

FIG. 15 shows a processing flow of a cluster generation apparatus in Embodiment 2 of the present disclosure.

The process of acquiring information on a user (step S101) and the process of generating a cluster (step S102) are the same as those in Embodiment 1.

In addition, a process of generating a route (step S103) or a process of displaying a route (step S104) may be included in the processing flow.

The summary display unit 335 uses the information on a cluster generated by the cluster generation unit 132 to analyze, create, and display: a spot summary showing the number of visits or a total staying time per spot, or the like; an area summary showing the number of spots or a total staying time per area, or the like; or the number of users or a total staying time per cluster, etc. (step S105).

The recommendation unit 336 uses the information on a cluster generated by the cluster generation unit 132 to recommend, to a store or user that belongs to a spot, area, or cluster, a type of a commodity or a service to deal with, another spot to visit, a commodity or a service to purchase, etc. (step S106).

Advantageous Effect

According to the present embodiment, it is possible to analyze how people gather in a spot or an area only by using the position information for the users and the information on spots visited by the users. Further, by performing the analysis for each spot, it is possible to analyze the popularity of the spot and which other spot the people in the spot more often come and go, which can be useful for marketing or the like.

In addition, performing the analysis for each area allows a comparison between areas and an analysis of a spot in the area where the users visit and spend time, which in turn allows a prediction as to what attribute is appropriate to a new commercial facility to be established.

Furthermore, by performing the analysis for each cluster, it is possible to analyze what characteristics a major cluster in a certain spot or area has, or what viewpoint the spot should focus on in the future (e.g., regarding what commodity or service to provide at a store).

In addition, the recommendation unit 336 offering a recommended spot, a recommended commodity or service, etc. based on the cluster analysis can be helpful in promoting regional development and stimulating consumption.

Embodiment 3

In Embodiment 3, in generating a cluster, clustering is performed using purchase information such as a commodity or service purchased by a user in a spot or a price thereof. The entire system configuration is the same as that of the cluster generation system shown in FIG. 1.

<A Configuration of a Cluster Generation Apparatus>

Figure 16:
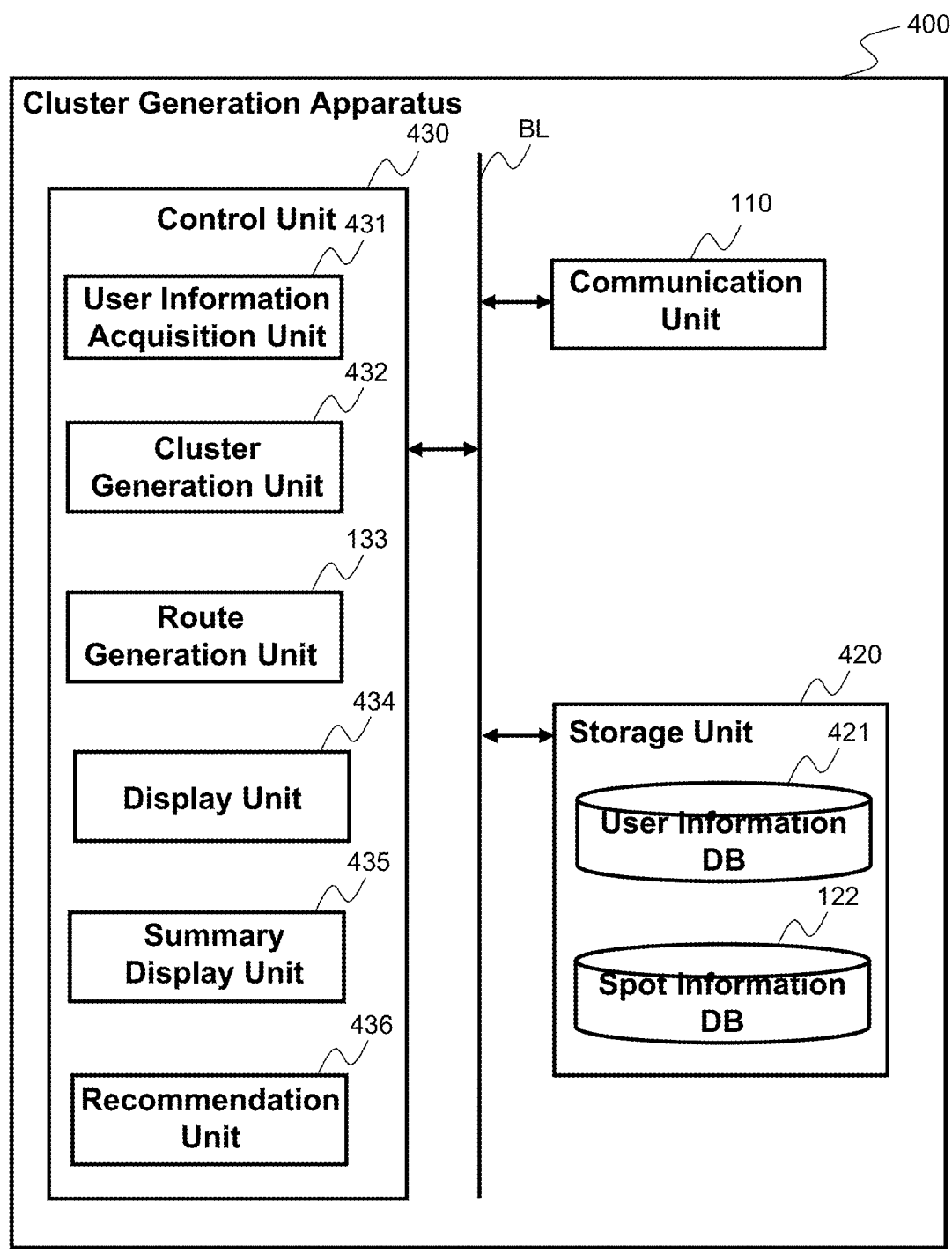
FIG. 16 is a schematic block diagram showing a configuration of a cluster generation apparatus according to Embodiment 3 of the present disclosure.

FIG. 16 shows a configuration of a cluster generation apparatus 400 according to the present embodiment. The configuration of the communication unit 110 is the same as that of the cluster generation apparatus 100. The user information DB 121 in the storage unit 120 stores not only position information and time information for users but also information on a commodity or service purchased at a spot and a price thereof. A control unit 430 includes a user information acquisition unit 431, a cluster generation unit 432, the route generation unit 133, a display unit 434, a summary display unit 435, and a recommendation unit 436.

The user information acquisition unit 431 acquires, from a user, not only position information and time information but also information on the type, amount, and name of a commodity or service that is purchased at a spot. These pieces of information may be acquired, for example, from a payment made on a terminal such as a smartphone used by the user. Alternatively, the pieces of information may be acquired from a POS terminal or entered by a user from a user terminal.

The user information acquisition unit 431 stores the purchase information for a commodity or service acquired from the user in the user information DB 121.

The cluster generation unit 432 may perform clustering in consideration of information such as a commodity or service purchased by users at spots, or the type or amount of the commodity or service.

The cluster generation unit 432 performs the clustering in consideration of, for example, not only commonality among spots (commonality among the users) but also commonality among purchase information such as users who have consumed P yen at spot A, users who have purchased clothes at spot A, or users who have purchased commodity B at spot A. That is, the clustering is performed based on the commonality among users, the commonality among purchased commodities or services, the commonality among purchase amounts, the commonality among types or classifications of purchased commodities or services, or the like.

The cluster generation unit 432 may perform the clustering so as to generate target M clusters in consideration of information such as a commodity or service purchased by the user at the spot, or the type or amount thereof as described above.

As described above, by generating the cluster in consideration of the purchase data of the users, it is possible to analyze the spot, area, and cluster from an economic viewpoint.

The display unit 434, when displaying a movement route of the users in the cluster, may display purchase information as well, such as the amount spent by the users for each spot.

For example, the display unit 434 may display a total consumption amount, which is a total amount of money spent at a spot, an average consumption amount, which is an average amount of money spent per user, and a top-selling commodity or service having a high popularity in the spot.

The summary display unit 435 uses the cluster generated by the cluster generation unit 432 to generate a spot summary, an area summary, and a cluster summary. In this case, information such as a commodity or service purchased by the users, or the type or amount thereof may also be taken into account to generate the spot summary, the area summary, and the cluster summary.

For example, the summary display unit 435 may calculate, from information on the users belonging to the spot, the area, or the cluster, a total amount of money spent as a total consumption amount and an average amount of money spent per person as an average consumption amount in the spot summary, area summary, or cluster summary to generate.

The summary display unit may create and display information such as information as to what commodity or service was consumed in each spot, area, or cluster, when the commodity or service was consumed, or how much the consumed commodity or service was, in chronological order.

The present embodiment shows an example in which the cluster generation unit 432 generates a cluster in consideration of user's purchase data; however, the cluster generation unit 432 may generate the cluster not in consideration of the user purchase data. Then, the summary display unit 435, when creating a summary, may display the summary in consideration of information such as a commodity or service purchased by the users, or the type or amount thereof.

Even if the cluster generation unit 432 does not take into account the commonality among commodities or services purchased by the users, the commonality among purchase amounts, or the commonality among types and classifications of the purchased commodities or services, the summary display unit 435 taking into account the information such as the commodity or service purchased by the users or the type or amount thereof would allow an analysis of a purchasing trend in each spot, area, or cluster.

Advantageous Effect

Thus, by the cluster generation unit 432 and/or the summary display unit 435 taking into account the information such as the commodity or service purchased by the users or the type or amount thereof, it is possible to analyze a purchasing trend and economic activity in each spot, area, or cluster.

By the analysis based on the users' purchasing trend,—it can be expected that the present disclosure will be used as a profile-based marketing and a recommendation tool. Furthermore, it can be expected that the present disclosure will be used in measuring effectiveness such as urban development, attracting of customers to facilities, or events.

As described above, displaying the summary created from multiple perspectives facilitates, for example, designing of a policy on economic activities or future development and allows visual analysis for governments and business operators.

This concludes the description of the embodiments, but the above embodiment is only one example. Therefore, specific configurations, processing, etc. of the cluster generation system 1 and the cluster generation apparatuses 100 and 300 are not limited to those described in the above embodiment.

A cluster generation system according to the present disclosure may also be realized by, for example, a computer executing a program, not by the devices described above. A program for realizing the function of an information providing system may be stored in a computer-readable recording medium such as a universal serial bus (USB) memory, a compact disc-read only memory (CD-ROM), a digital versatile disc (DVD), or a hard disc drive (HDD), or may be downloaded to a computer via a network.

Although a preferred embodiment of the present disclosure has been described above, the present disclosure is not limited to such a specific embodiment but includes the inventions recited in the claims and equivalents thereof. In addition, the configurations of the devices described in the above embodiment and modification can be combined as appropriate, as long as no technical contradiction arises.

The invention claimed is:

1. A cluster generation apparatus comprising:
processing circuitry configured to:
acquire position information and time information for a plurality of users, wherein acquiring the position information and the time information comprises one or more of: acquiring the position information and the time information from one or more devices associated with a first portion of the plurality of users, determining that a second portion of the plurality of users have interacted with a device having a known location, and identifying a third portion of the plurality of users from social media information;
generate a cluster based on spots visited by the users by using the position information for the users, the cluster being a classification of the users;
generate for the cluster, a movement route based on a history of movement of the cluster between the spots, from the time information and the position information for the users belonging to the cluster; and
after acquiring the position information of a user in the plurality of users including spots visited by the user in the plurality of users, generate a recommendation for the user in the plurality of users of at least one further spot not in the spots visited by the user in the plurality of users, based on analysis of the cluster to which the user in the plurality of users belongs, and output the recommendation to the user in the plurality of users,
wherein generating the cluster based on visited spots comprises generating the cluster based on commonality among the visited spots, wherein the processing circuitry is configured to give a rarity score to a spot visited by only some of the users, and wherein the processing circuitry is configured to preferentially generate a cluster having a high total value of the rarity score for spots belonging to the cluster in generating the cluster based on the commonality among the visited spots.

2. The cluster generation apparatus according to claim 1, wherein when the position information for the users is within a given range from position information for the spots, the processing circuitry is configured to determine that the users have visited the spots and generates a cluster.

3. The cluster generation apparatus according to claim 1, wherein the processing circuitry is configured to generate the cluster further based on any one or more of a visit time, the number of visits, and a staying time for the spots to classify the cluster.

4. The cluster generation apparatus according to claim 1, wherein purchase information for the users is also acquired, and wherein the processing circuitry is configured to generate the by further using, to classify the cluster, the purchase information for the users.

5. The cluster generation apparatus according to claim 1, wherein the processing circuitry is configured to generate, for each classified cluster, a movement route by connecting spots common in the cluster as a main movement route based on a history of movement of users belonging to the cluster between spots, the common spots being spots where a large number of the users have moved to or from.

6. The cluster generation apparatus according to claim 5, wherein the processing circuitry is configured to set, for each classified cluster, a threshold value based on a history of movement of users belonging to the cluster between spots, wherein the processing circuitry is configured to generate a plurality of movement routes including the main movement route and a sub movement route, wherein each of the plurality of movement routes exceeds the threshold value.

7. The cluster generation apparatus according to claim 1, wherein the processing circuitry is further configured to display, for each generated cluster, a diagram of a network of spots belonging to the cluster and/or displays a movement route through spots that is generated in generating the movement route.

8. The cluster generation apparatus according to claim 7, wherein the processing circuitry is configured to display the movement route such that the main movement route and the sub movement route are distinguishable from each other.

9. The cluster generation apparatus according to claim 7, wherein the processing circuitry is configured to display the movement route on a map.

10. The cluster generation apparatus according to claim 7, wherein the processing circuitry is configured to display purchase information for users together with the movement route.

11. The cluster generation apparatus according to claim 1, wherein the processing circuitry is further configured to display at least a cluster to which the spots belong.

12. The cluster generation apparatus according to claim 11, wherein the processing circuitry is configured to set a given range as an area and to display a cluster belonging to the area.

13. The cluster generation apparatus according to claim 11, wherein the processing circuitry is configured to estimate an attribute of the cluster based on information on spots common in the cluster and to display the attribute as a cluster summary.

14. The cluster generation apparatus according to claim 1, wherein the processing circuitry is further configured to recommend a commodity or service.

15. A cluster generation method, which, when executed by processing circuitry of a computer, cause the processing circuitry to execute the method comprising:
acquiring position information and time information for a plurality of users, wherein acquiring the position information and the time information comprises one or more of: acquiring the position information and the time information from one or more devices associated with a first portion of the plurality of users, determining that a second portion of the plurality of users have interacted with a device having a known location, and identifying a third portion of the plurality of users from social media information;
generating a cluster based on spots visited by the users by using the position information for the users, the cluster being a classification of the users;
generating, for the cluster, a movement route based on a history of movement of the cluster between the spots, from the time information and the position information for the users belonging to the cluster; and
after acquiring the position information of a user in the plurality of users including spots visited by the user in the plurality of users, generating a recommendation for the user in the plurality of users of at least one further spot not in the spots visited by the user in the plurality of users, based on analysis of the cluster to which the user in the plurality of users belongs, and outputting the recommendation to the user in the plurality of users,
wherein generating the cluster based on visited spots comprises generating the cluster based on commonality among the visited spots, wherein the method comprises giving a rarity score to a spot visited by only some of the users, and wherein the method comprises preferentially generating a cluster having a high total value of the rarity score for spots belonging to the cluster in generating the cluster based on the commonality among the visited spots.

16. A non-transitory computer-readable storage medium, storing computer-readable instructions thereon, which, when executed by processing circuitry cause the processing circuitry to execute a method comprising:
　acquiring position information and time information for a plurality of users, wherein acquiring the position information and the time information comprises one or more of: acquiring the position information and the time information from one or more devices associated with a first portion of the plurality of users, determining that a second portion of the plurality of users have interacted with a device having a known location, and identifying a third portion of the plurality of users from social media information;
　generating a cluster based on spots visited by the users by using the position information for the users, the cluster being a classification of the users;
　generating, for the cluster, a movement route based on a history of movement of the cluster between the spots, from the time information and the position information for the users belonging to the cluster; and
　after acquiring the position information of a user in the plurality of users including spots visited by the user in the plurality of users, generating a recommendation for the user in the plurality of users of at least one further spot not in the spots visited by the user in the plurality of users, based on analysis of the cluster to which the user in the plurality of users belongs, and outputting the recommendation to the user in the plurality of users,
　wherein generating the cluster based on visited spots comprises generating the cluster based on commonality among the visited spots, wherein the method comprises giving a rarity score to a spot visited by only some of the users, and wherein the method comprises preferentially generating a cluster having a high total value of the rarity score for spots belonging to the cluster in generating the cluster based on the commonality among the visited spots.

* * * * *